United States Patent
Baska et al.

(10) Patent No.: US 12,480,610 B2
(45) Date of Patent: Nov. 25, 2025

(54) SOLID LUBRICANT FOR Zn-Ni COATING ON A THREADED TUBULAR ELEMENT

(71) Applicants: VALLOUREC OIL AND GAS FRANCE, Aulnoye-aymeries (FR); NIPPON STEEL CORPORATION, Tokyo (JP)

(72) Inventors: Philippe Baska, Meudon (FR); Marie Thomas, Meudon (FR)

(73) Assignees: VALLOUREC OIL AND GAS FRANCE, Aulnoye-aymeries (FR); NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/688,181

(22) PCT Filed: Sep. 6, 2022

(86) PCT No.: PCT/FR2022/051678
§ 371 (c)(1),
(2) Date: Feb. 29, 2024

(87) PCT Pub. No.: WO2023/037069
PCT Pub. Date: Mar. 16, 2023

(65) Prior Publication Data
US 2025/0003533 A1  Jan. 2, 2025

(30) Foreign Application Priority Data
Sep. 7, 2021  (FR) ...................... 2109366

(51) Int. Cl.
*F16L 58/18*  (2006.01)
*E21B 17/042*  (2006.01)
*F16L 15/04*  (2006.01)

(52) U.S. Cl.
CPC .......... *F16L 58/182* (2013.01); *E21B 17/042* (2013.01); *F16L 15/04* (2013.01)

(58) Field of Classification Search
CPC ........ F16L 15/04; F16L 58/182; E21B 17/042
See application file for complete search history.

(56) References Cited

U.S. PATENT DOCUMENTS

| 2003/0094810 A1 | 5/2003 | Goto et al. |
| 2006/0197343 A1* | 9/2006 | Imai ...................... F16L 58/182 |
| | | 285/94 |

(Continued)

FOREIGN PATENT DOCUMENTS

| WO | WO 2006/104251 A1 | 10/2006 |
| WO | WO 2016/170031 A1 | 10/2016 |
| WO | WO 2016/170037 A1 | 10/2016 |

OTHER PUBLICATIONS

International Search Report issued Dec. 20, 2022 in PCT/FR2022/051678, filed on Sep. 6, 2022, 3 pages.

*Primary Examiner* — David Bochna
(74) *Attorney, Agent, or Firm* — Oblon, McClelland, Maier & Neustadt, L.L.P.

(57) ABSTRACT

A tubular threaded element for the drilling, the operation of hydrocarbon wells, the transport of oil and gas, the transport or the storage of hydrogen, the carbon capture or the geothermal energy, including a metal body and at least one threaded end including at least one threaded portion, the threaded end including a multilayer coating on at least one portion of the surface of the threaded end wherein the multilayer coating includes a first layer including a solid coating including Zinc-Nickel electrodeposited on the at least one portion of the surface of the threaded end, a second oxalation-type conversion layer above the first layer, a third (Continued)

layer including a polyurethane or epoxy matrix loaded with solid lubricant particles above the second layer.

13 Claims, 5 Drawing Sheets

(56) References Cited

U.S. PATENT DOCUMENTS

| | | | |
|---|---|---|---|
| 2006/0228505 A1* | 10/2006 | Goto | E21B 17/042 428/36.9 |
| 2018/0171261 A1 | 6/2018 | Verleene et al. | |
| 2018/0172197 A1 | 6/2018 | Verleene et al. | |
| 2023/0312946 A1* | 10/2023 | Abe | F16L 15/04 508/104 |

* cited by examiner

SOLID LUBRICANT FOR Zn-Ni COATING ON A THREADED TUBULAR ELEMENT

TECHNICAL FIELD

The invention relates to steel components or conduits with coatings in the field of oil and gas, energy or storage, for a use such as the operation of wells or the transport of hydrocarbons, the hydrogen transport or storage, the geothermal energy or the carbon capture

Technology Background

Herein, the term "component" means any element, accessory or conduit, used to drill or operate a well and comprising at least one connection or connector or even a threaded end, and intended to be assembled by a threading to another component to constitute a threaded joint with this other component. The component may for example be a tube or a tubular threaded element of relatively long length (in particular about ten metres in length), for example a tube, or else a tubular sleeve of a few tens of centimetres in length, or even an accessory of these tubular elements (suspension device or "hanger", section change part or "cross-over", safety valve, connector for drill rod or "tool joint", "sub", and the like).

The tubular threaded components or elements are provided with threaded ends. These threaded ends are complementary allowing the coupling of two male ("Pin") and female ("Box") tubular threaded elements therebetween. There is therefore a male threaded end and a female threaded end. The threaded ends called premium or semi-premium threaded ends generally include at least one stop surface. A first stop may be formed by two surfaces of two threaded ends, oriented substantially radially, configured so as to be in contact with each other after screwing the threaded ends to each other or during compressive stresses. The stops generally have negative angles relative to the main axis of the connections. Intermediate stops are also known on joints including at least two threading stages. A threaded portion, a stop surface as well as a sealing surface can form an assembly called a threaded end. There may be a threaded end with a thread oriented towards the outside of the tube, that is to say a male threaded end, and a threaded end with a thread oriented towards the inside of the tube, that is to say a female threaded end. The tubular threaded elements, of the casing and completion type, are made of steel and can be manufactured, without limitation, in accordance with the API standards specification 5CT or 5CRA for standard casings and tubes. For example, the steel can be one of the L80, P110 or Q125 grades.

The conditions of use of these tubular threaded elements generate different types of loads. Said loads have been partially reduced, among others, by using films or greases on the sensitive portions of these components such as the threaded areas, the stop areas or even the metal/metal sealing surfaces. The induced stresses comprise in particular the stresses due to maintenance in storage, requiring the application of storage greases (different from the extra greases applied before commissioning). However, other solutions exist, consisting in using organic coatings. Thus, the screwing operations are generally carried out under a high axial load, for example because of the weight of a tube several meters long to be coupled via the threaded end, possibly aggravated by a slight misalignment of the axis of the threaded elements to be coupled. This leads to risks of galling in the threaded areas and/or in the metal/metal sealing surfaces. Thus, the threaded areas as well as the metal/metal sealing surfaces are commonly coated with lubricants.

In addition, the tubular threaded elements are often stored then used in an aggressive environment. This is the case, for example, in an "offshore" situation in the presence of a salt spray, or in an "onshore" situation in the presence of sand, dust and/or other pollutants. Thus, it is necessary to use different types of anti-corrosion coatings on the surfaces which are loaded during screwing, which is the case of the threaded areas or even of the areas in clamping contact, but also the case of the metal/metal sealing surfaces, of the seat and of the stops.

However, with regard to the environmental standards, it appears that the use of greases in accordance with the API RP 5A3 (American Petroleum Institute) standard does not constitute a long-term solution, since such greases are brought to be extruded from the tubular components and released into the environment or into the well, causing blockages which require particular cleaning operations.

An alternative to grease is to use dry and/or solid first layer or deposition. These metal depositions which can be chemically or electrochemically applied. Depending on the nature of the deposition, this can provide an anti-corrosive and lubricating property to prevent the galling of the threaded tubular connections during screwing, and this in a manner which is more durable than an applied grease and less polluting due to a better solidity. However, it has been shown that these depositions can themselves be subject to corrosion, and therefore possibly to delamination, in an aggressive environment, for example in a humid environment, by aging of said deposition, during over-stresses of the connection, during its operation in a well, as well as during repeated screwing and unscrewing operations. This corrosion or this delamination is undesirable because it can imply both a risk of weakening the connection as well as a loss of sealing by the creation of a leakage path linked to the corrosion of the steel substrate of the tubular threaded element. A leakage can cause considerable economic and even environmental consequences, for example when a leakage occurs in a hydrocarbon well during its operation.

A state-of-the-art solution disclosed by EP 3286288 is to add a trivalent chromium passivation type conversion layer over a solid deposition in order to isolate said solid deposition. However, the applicant has determined that this passivation layer does not assume a lubricating function, nor does it allow improving the lubricating properties of an upper layer. Due to this lack of lubricating capacity, there is a loss of efficiency in screwing/unscrewing tests with a higher risk of galling and lineage of the connection, as well as an undesired increase in the screwing torque. An increase in the screwing torque involves a risk of exceeding the capacities of the screwing key and implies an inability to screw the connection and ensure the sealing thereof.

The term "lineage" means a groove or a scratch.

In general, the deposition of a conversion layer is carried out by inserting the surface of interest into a chemical bath for which the parameters such as the duration of the deposition, the composition and the temperature of the chemical solution are controlled.

The invention allows solving all previously mentioned problems. In particular, the invention proposes to improve and stabilise the sub-layer or solid deposition, while having a conversion treatment compatible with the current equipment, a chemistry as well as an easily controllable bath management.

According to one embodiment, the invention provides a tubular threaded element for the drilling, the operation of hydrocarbon wells, the transport of oil and gas, the transport or the storage of hydrogen, the carbon capture or the geothermal energy, comprising a metal body and at least one threaded end comprising at least one threaded portion, said threaded end comprising a multilayer coating on at least one portion of the surface of the threaded end characterised in that said multilayer coating comprises a first layer comprising a solid coating comprising Zinc-Nickel electrodeposited on said at least one portion of the surface of the threaded end, a second oxalation-type conversion layer above the first layer, a third layer comprising a polyurethane or epoxy matrix loaded with solid lubricant particles above the second layer.

Thanks to this feature, the first solid deposition layer comprising zinc-nickel confers improved lubricating properties, whose effects are preserved from delamination, lineage and galling. Indeed, the second layer of oxalation acts on the first layer as a solid lubricant. The latter allows conferring on the solid deposition layer comprising Zn—Ni to have a much more stable and durable coefficient of friction. Said obtained coefficient of friction possibly being less than 0.2. Indeed, beyond 0.2 the applicant has observed that there may be a risk of galling. The second oxalation layer also allows conferring a chemically or mechanically insulating barrier effect for the sub-layer or first solid deposition layer comprising Zn—Ni. The second oxalation layer amplifies the effects of the third lubricating layer. The latter confers an additional effect of lubrication thus increasing the screwing capacities of a connection.

Surprisingly, the conversion layer when it is of the oxalation type has a homogeneous aspect on the circumference of the connection, independently of the flows and the temperatures in the bath. This allows much more easily identifying a covering problem. Moreover, the oxalation layer allows a better adhesion of the entire coating in wet conditions and after aging, i.e. a better preservation of the performance even after a long storage.

Moreover, the use of oxalic acid is less restrictive with regard to the regulations in force and is not a product classified as CMR, that is to say it is not carcinogenic, mutagenic or reprotoxic.

The term "coverage problem" means a lack of coverage of the sub-layer or the first deposition layer, that is to say areas of the first layer which is not covered by the oxalation layer and visible to the naked eye.

According to one embodiment, the tubular threaded element has a second oxalation-type conversion layer which can comprise nickel oxalate and/or zinc oxalate.

Thanks to this feature, nickel oxalate and zinc oxalate allow delaying the metal/metal contact and storing a portion of the energy dissipation emitted during the screwing of the connection. Surprisingly, it has been observed that the addition of a nickel oxalate allows improving the anticorrosion resistance of the conversion layer.

According to one embodiment, the tubular threaded element has a second layer which may comprise 10 to 20% carbon, 35% to 50% zinc and 35 to 45% oxygen, 0% to 35% nickel.

Thanks to this feature, surprisingly, it has been determined by the applicant that the oxalation layer confers a better resistance of the material to the multilayer coating.

According to one embodiment, the layer weight of the second layer can be comprised between 0.1 g/m$^2$ and 20 g/m$^2$.

Thanks to this feature, it has been determined that the endurance is proportional to the layer weight, the greater the layer weight, the greater the endurance.

However, when the layer weight exceeds a certain threshold, the result is problems of cohesive failure in the oxalation layer. The layer ends up breaking on its own when subjected to external stresses. Consequently, there will be risks of delamination and flaking for both the oxalation layer which will lead therewith to the delamination of the third layer.

According to one embodiment, the surface mass of the second layer may be comprised between 0.5 g/m$^2$ and 10 g/m$^2$. The applicant has determined that up to 10 g/m$^2$ there is a better compromise between good endurance and reduced risk of cohesive failure.

According to one embodiment, the porosity of the second layer can be comprised between 5% and 35%.

According to one embodiment, the porosity of the second layer can be comprised between 10% and 25%.

Thanks to this feature, the porosity allows improving the retention and the coating of the upper layer thanks to a phenomenon of anchoring of the upper layer in the empty spaces of the oxalation layer.

According to one embodiment, the thickness of the second layer can be comprised between 0.5 μm and 30 μm.

According to one embodiment, the thickness of the second layer can be comprised between 1 μm and 20 μm.

Thanks to this feature, the resistance of the material of the multilayer coating is improved. When the thickness of the layer exceeds 30 μm, cohesive failure problems may appear. A layer of less than 0.5 μm can be insufficient and cause problems of insufficient lubrication.

According to one embodiment, the second layer may comprise a texture of the microcracked polyhedron type texture with edges of 1 μm to 30 μm width.

The term "microcracked polyhedron" means a 3-dimensional geometric shape having planar polygonal faces which are grouped into segments called edges. The number of faces and edges is random, the length of the edges can range from 0.5 μm to 30 μm. The layer may have randomly distributed microcracks. The width of the cracks can range from 0.05 μm to 1 μm wide.

Thanks to this feature, a texture of the microcracked polyhedron type gives the upper layer an improved capacity of retention and attachment to the oxalation layer.

According to one embodiment, the invention is also a method for manufacturing a tubular threaded element comprising the following steps:

- A step of electrodepositing a zinc-nickel layer on a metal surface of a threaded end
- An oxalation-type conversion step by immersion
- A step of covering with a lubricating layer comprising a polyurethane or epoxy matrix loaded with solid lubricant particles.

Thanks to this feature, the coating is done without visible alteration of the zinc-nickel layer.

The term "immersion" means a technique of treatment by immersing the surface in an oxalation bath.

According to one embodiment, the oxalation-type conversion step can be carried out at a temperature comprised between 25° C. and 90° C.

Thanks to this feature, it is possible to use the same tools as those of the passivation, less costly to set up and in terms of material.

According to one embodiment, the oxalation-type conversion step may comprise the use of an oxalic acid and the concentration of said oxalic acid may be comprised between 1 g/L and 75 g/L.

Thanks to this feature, there is a better management and control of the layer weight of the oxalation layer. Indeed, the surface conversion reaction is all the more fast as 75 g/L is approached According to one embodiment, the oxalation-type conversion step can comprise the use of an oxalic acid associated with an additive selected from a nitrate, chloride, thiocyanate or thiosulphate element or several additives in combination.

Thanks to this feature, an additive allows accelerating the surface conversion reaction, and thus to more quickly achieve the desired layer weight characteristics.

The method for depositing the oxalation layer can be carried out over a time range between 30 seconds and 15 minutes. Indeed, the time has an influence on the layer weight value. Said value is proportional to the immersion time.

Below 30 seconds the layer weight will be insufficient. Above 15 minutes there is no longer any significant change in the layer weight value.

BRIEF DESCRIPTION OF FIGURES

The invention will be better understood, and other aims, details, features and advantages thereof will appear more clearly during the following description of several particular embodiments of the invention, given only for illustrative and non-limiting purposes, with reference to the appended drawings.

DESCRIPTION OF THE EMBODIMENTS

Figure 1:
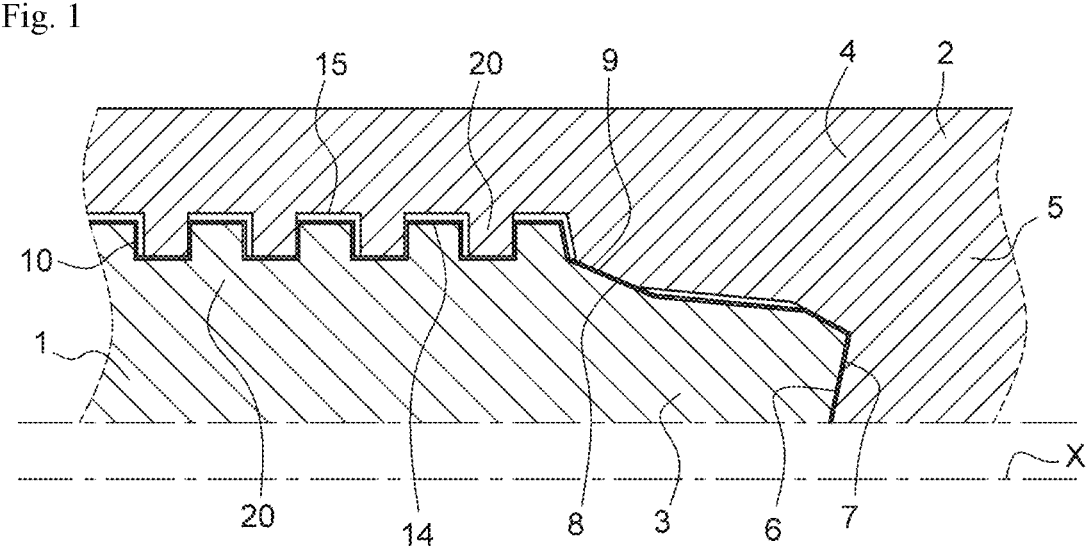
FIG. 1 schematically shows, in a partial view in longitudinal section, a joint resulting from the assembly of two male and female tubular threaded elements according to the invention.

In the remainder of the description, the terms "longitudinal", "transverse", "vertical", "front", "rear", "left" and "right" are defined according to a usual orthogonal reference frame as represented in the drawings, which comprises:

A horizontal longitudinal axis X, and from left to right of the sectional views;

Moreover, in the description and the claims, the terms "external" or "internal" and the "axial" and "radial orientations" will be used to designate, according to the definitions given in the description, elements of the tubular threaded joint. The longitudinal axis X determines the "axial" orientation. The "radial" orientation is directed orthogonally to the longitudinal axis X.

FIG. 1 shows a joint or a connection, along the longitudinal axis X, of a first male tubular threaded element (1) according to the invention, comprising a metal body (5) and a male threaded end (3), said male threaded end (3) comprising a male stop surface (6), a male sealing surface (8) and a male threaded portion (14), the first male tubular threaded element (1) being represented assembled with a second tubular threaded element (2) according to the invention, comprising a metal body (5) and a female threaded end (4), said female threaded end (4) comprising a female stop surface (7), a female sealing surface (9), and a female threaded portion (15).

Each of the male (3) and female (4) threaded ends consist of a metal substrate (20) and a multilayer coating (10) on this metal substrate (20).

The threaded tubular elements (1, 2) are represented in the screwed state, but the invention does not exclude that they can be in the unscrewed unitary state.

The multilayer coating (10) can be on one or the other of the male (3) and female (4) threaded ends or even on both at the same time. In particular, said multilayer coating (10) can be on a male (6) or female (7) stop surface, on a male (8) or female (9) sealing surface, or even on a male (14) female (15) threaded portion, on several of these surfaces or all these surfaces. Concerning FIG. 1, the multilayer coating (10) is on the male threaded end (3).

Figure 2:
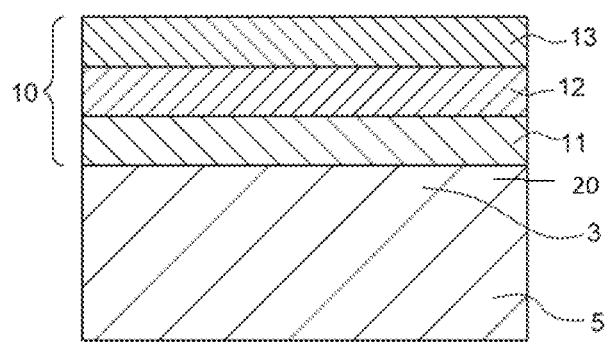
FIG. 2 schematically shows, in a longitudinal section, a section of the multilayer coating according to the invention.

FIG. 2 shows a longitudinal sectional view of a multilayer coating (10) on the metal substrate (20) of a male threaded end (3). However, said coating (10) may just as well be on the metal substrate of a female threaded end. Thus, all developments concerning the multilayer coating (10) on the male threaded end (3) apply analogously to a multilayer coating (10) on the female threaded end.

In particular, the figure shows the multilayer coating (10) comprising a first layer (11) of a solid coating comprising Zinc-Nickel electrodeposited on the surface of the male threaded end (3), that is to say on the metal substrate (20) which constitutes said male threaded end (3).

Said multilayer coating (10) comprises a second oxalation-type conversion layer (12) above the first layer (11).

The second conversion layer (12) of the oxalation type can comprise nickel oxalate and/or zinc oxalate (not shown in the Figure). These two elements can originate from the oxalation layer, by reaction between oxalic acid and the zinc-nickel layer.

Finally, a third lubricating layer (13) comprising a polyurethane or epoxy matrix loaded with solid lubricant particles is deposited above the second layer (12). The solid lubricant particles are selected, without limitation, from PTFE, talc, chromium oxide, alumina.

Advantageously, the first solid deposition layer (11) comprising zinc-nickel confers improved lubricating properties, whose effects are preserved from delamination, lineage and galling. Indeed, the second oxalation layer acts on the first layer as a solid lubricant. The latter allows giving the first solid deposition layer (11) comprising Zn—Ni to have a much more stable and durable coefficient of friction. Said coefficient of friction being less than 0.2. Indeed, beyond 0.2 there is a risk of galling.

Figure 3:
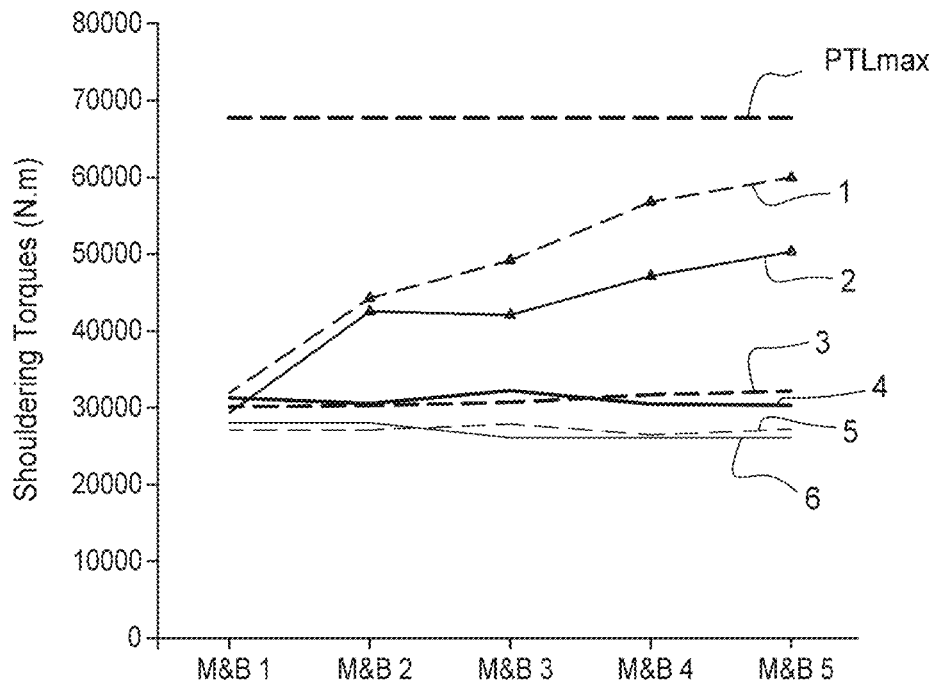
FIG. 3 shows a graph representing the evolution of the screwing torque at each end of screwing for different types of coatings on tubular threaded elements, for different connections including either oxalation or passivation.
Figure 4:
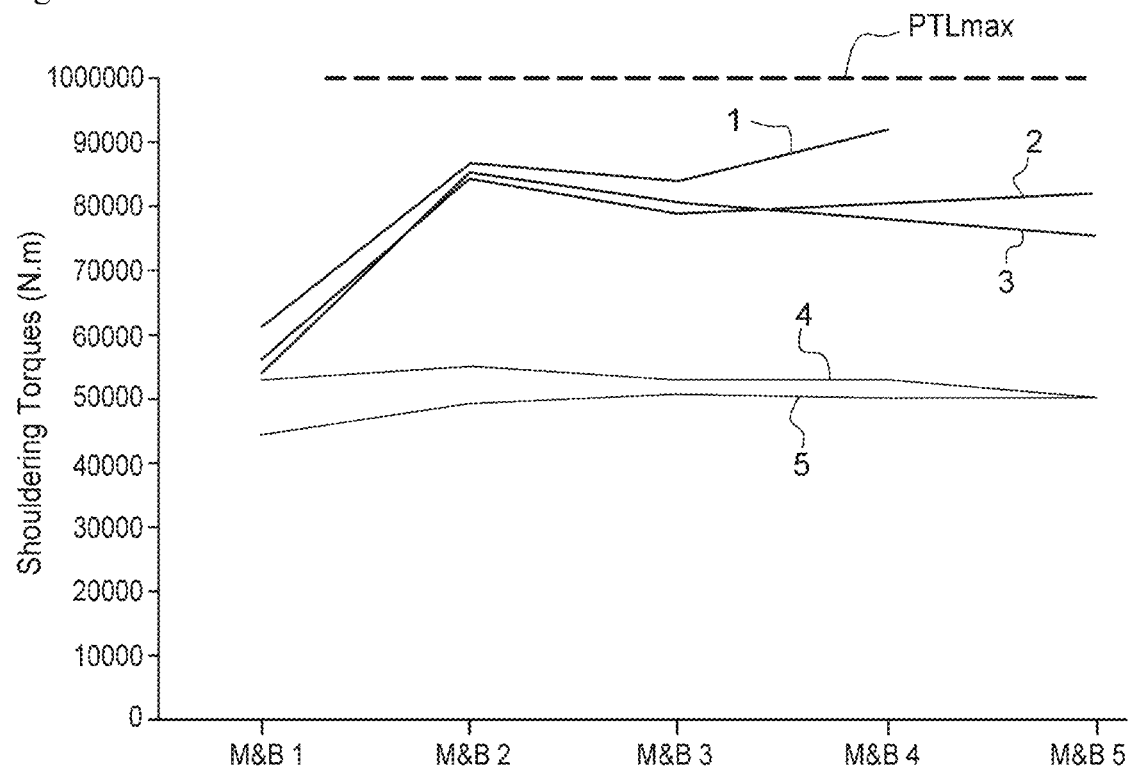
FIG. 4 shows a graph representing the evolution of the screwing torque at each end of screwing for different types of coatings on tubular threaded elements, for one of the connections different from that of FIG. 3 and comprising either oxalation or passivation.

The applicant has indeed demonstrated by comparison that this stability and this durability were not found with a passivation layer (see FIG. 3 and FIG. 4). The second oxalation layer (12) also allows conferring a chemical or mechanical insulating barrier effect for the sub-layer or first layer (11) of solid deposition comprising Zn—Ni. The second oxalation layer (12) amplifies the effects provided by the third layer (13). The latter conferring an additional lubricating effect in synergy with the lubricating effect conferred by the second layer (12) thus increasing the screwing capacities of a connection (see FIG. 3).

Moreover, the use of oxalic acid is less restrictive relative to the regulations in force and is not classified as CMR, that is to say it is not carcinogenic, mutagenic or reprotoxic.

Advantageously, the second oxalation layer (12) comprises nickel oxalate and zinc oxalate and allows delaying the metal/metal contact and storing a portion of the dissipation energy emitted during screwing the connection.

Indeed, during the crushing of the coating (10) under the action of the screwing of the threaded ends, the functional surfaces of the ends come into contact with very high contact pressures. The second layer (12) will be crushed first by undergoing the effects of stresses and pressures before the first solid layer (11), which preserves said first layer (11) and improves the overall endurance of the coating (10). In addition, surprisingly, it has been found that the addition of a nickel oxalate allows improving the anti-corrosion resistance of the conversion layer.

FIG. 3 shows, in a comparative manner, the evolution of the screwing torque at each end of screwing for different types of coatings on tubular threaded elements, either according to the state of the art with a passivation type layer, or according to the invention with an oxalation-type layer. The term "end of screwing" means the moment when the two stops of a male tubular threaded element and of a female tubular threaded element are in contact during a screwing/unscrewing cycle (M&B).

One method used to ensure that the connections are assembled correctly and to determine the end of screwing time consists in monitoring the torque applied by a collet against the number of revolutions. The term "collet" means a high-capacity self-locking wrench used to grip the male and female components of the connection and apply a clamping/unclamping torque. By connecting a computer to the load cell on the collet and an electronic revolution counter, a graph can be plotted showing the torque on the vertical axis and the number of revolutions on the horizontal axis. By collecting each of the performed ends of screwing, a new graph can be replotted as represented in FIG. 3.

FIG. 3 also shows a dashed line located approximately at 70,000 N·m which represents the PLT, that is to say the capacity of the maximum wrench. When the curve approaches or reaches this maximum wrench capacity, there is a high probability that the galling of the connection occurs and to limit the number of maximum clamping/unclamping or screwing/unscrewing possibilities (M&B).

All connections used in this FIG. 3, without taking into account the coating, are identical, that is to say that they correspond to tubular threaded elements of the VAM® SLIJ-II type. These types of tubes are tested and validated according to the API RP 5C5: 2017 CAL II standard.

Each curve represents a coating comprising a first layer of electrodeposited zinc-nickel, as well as a second passivation-type or oxalation-type conversion layer according to the invention and a third lubricating layer. Therefore, only the nature of the second conversion layer is varied from one curve to another.

The curves 1 and 2 represent a coating comprising a chromium III passivation layer. The presence of two curves corresponds to two screwing tests with an identical coating.

The curves 3 and 4 represent a coating comprising an oxalation layer for which an iron nitrate accelerator was used during the deposition of the layer. The presence of two curves corresponds to two screwing tests with an identical coating.

The curves 5 and 6 represent a coating comprising an oxalation layer without accelerator. The presence of two curves corresponds to two screwing tests with an identical coating.

FIG. 3 shows that all the curves representative of the passivation, namely the curves 1 and 2, show an increase in the torque for each screwing/unscrewing operation and come dangerously close to the PLT as the screwing/unscrewing revolutions progress. The opposite is observed with the curves representative of oxalation, namely the curves 3, 4, 5 and 6. Indeed, these curves are substantially flat, resulting in stable torques as the screwing/unscrewing operations progress. Although the curves 3, 4, 5 and 6 show a stability up to 5 revolutions of screwing/unscrewing, the applicant has been able to demonstrate that this stability can go up to 15 revolutions of screwing/unscrewing when the second layer (12) is an oxalation layer according to the invention.

In addition, it was noted for the coatings of curves 1 and 2, as the revolutions of screwing/unscrewing progress, the appearance of galling, lineage at the bottoms of the threads, the top of the threads and thread seat, and therefore a damage to the electrodeposited zinc-nickel layer.

With regard to the oxalation-type coatings, the applicant found no form of galling, un absence of damage to the first zinc-nickel layer and the formation of a tribofilm which confers effects of insulating barrier to the entire multilayer coating.

The results of the comparative analysis are not limited and remain valid for any type of tubes in the field of oil and gas, energy or storage, for a use such as the exploitation of wells or the transport of hydrocarbons, the transport or the storage of hydrogen, the geothermal energy or the carbon capture.

FIG. 4 describes similarly to FIG. 3, a comparison of the evolution of the screwing torque at each end of screwing in the same manner as for the tests in FIG. 3, and for different types of coatings, on another type of connection, namely VAM® SLIJ-III.

The curves 1, 2 and 3 correspond to threaded ends coated with a coating comprising a second passivation-type layer. The coating is on the entire threaded end, namely the threading or a threaded portion, the stop surface and the sealing seat. There are 3 curves because they correspond to the number of tests carried out with the same coating. The curves 4 and 5 correspond to threaded ends with a multilayer coating according to the invention comprising a second oxalation-type layer.

The comparative analysis and the resulting results are similar to those developed for FIG. 3.

The curves 1, 2, 3 show an increase in the torque from the second screwing/unscrewing. The curve 1 shows an impossibility of performing a fifth screwing/unscrewing for the corresponding joint due to galling, while the curves 4 and 5 show a torque stability for all screwing/unscrewing.

The applicant demonstrates that the conclusions of the superior effects in terms of stability and reliability of the oxalation according to the invention relative to the passivation are not limited to VAM® SLIJ-II alone and can therefore be transposed from one type connection to another.

Figure 5:
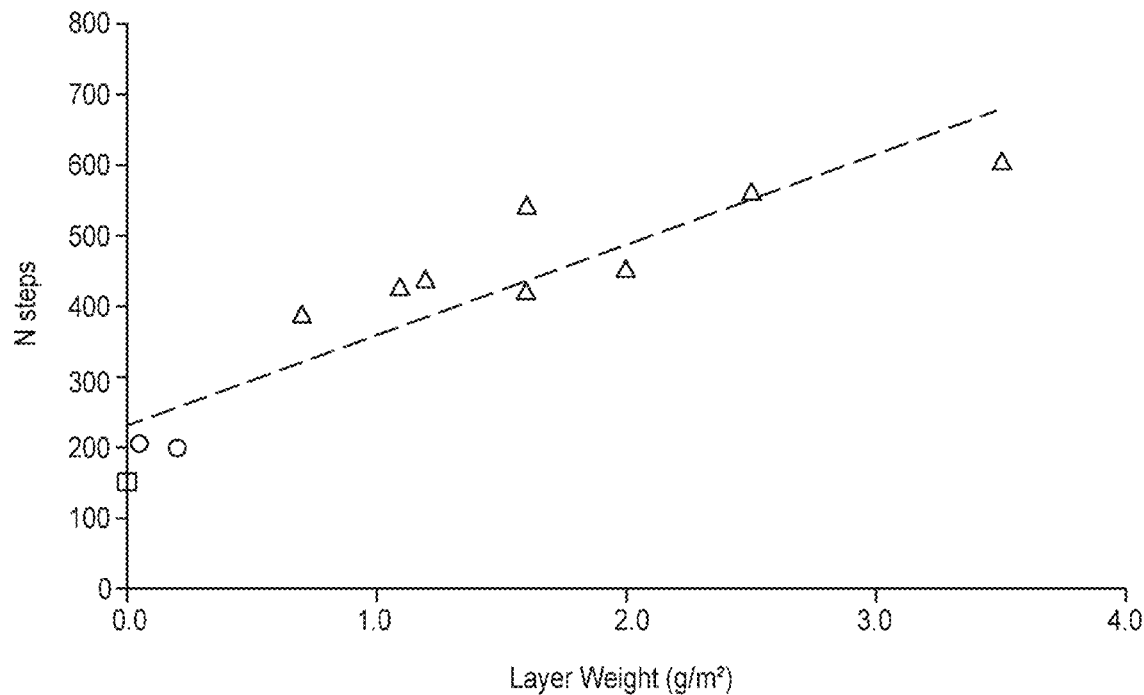
FIG. 5 shows a graph representing the number of steps required during a BOWDEN test depending on a layer weight for different types of conversion, in particular to reach 0.2 of coefficient of friction relative to the layer weight.

FIG. 5 shows a graph of the required number of steps, that to say the number of round trips of a steel ball, depending on the layer weight of a second conversion layer, during a BOWDEN test to reach 0.2 of coefficient of friction depending on the type of coatings.

Each tested sample has a coating which comprises identically at least one first Zn—Ni layer and a lubricant layer, the variable between the samples is the presence and/or the nature of the second layer.

There is a comparison of 3 types of coatings, namely a coating without a conversion layer, that is to say neither passivation nor oxalation, the layer weight will therefore be 0 g/m² (represented by a square on the graph). A coating with a second passivation-type layer with two examples of layer weights set respectively at 0.1 g/m² and 0.15 g/m² (represented by a circle on the graph). Indeed, for the passivation, it is difficult or even impossible to find layer weight values which are greater than 0.2 g/m². Finally, a multilayer coating, according to the invention, with a second oxalation-type layer (represented by a triangle on the graph), numerous tests have been carried out with this type of coating with different layer weight values.

When two rough movable parts are in contact, a wear mechanism can lead to a shrinkage of the material with generation of debris which is the consequence of a plastic deformation. The value of the coefficient of friction depends on the composition and the structure of the surface, its roughness and its mechanical properties such as plasticity, ductility and surface resistance to shear stresses. In the case of a coating on a connection, the value of a coefficient of friction must be less than 0.2. Indeed, beyond 0.2, there is a risk of galling.

In order to evaluate the lubricating properties (coefficient of friction) of the coating surface, a commercially available Bowden Friction Tester (Shinko Engineering Co., Ltd.) was used. In the Bowden Friction Tester, a steel ball (100CR6) was displaced back and forth in a straight line over a coating formed on a steel sheet while a load was applied to the ball. The coefficient of friction was measured from the frictional force and the pressure load at that time.

A commercially available steel ball made of steel (100CR6) with an outer diameter of 10 mm (Amatsuji Steel Ball Manufacturing Co., Ltd.) which is previously degreased is used as the steel ball in the Bowden friction test.

The steel ball is applied to the evaluated coatings and moved with a pressing load of 300 N.

FIG. 5 shows that the coating without a conversion layer reaches the critical threshold of 0.2 of friction before reaching 150 steps.

The coating with passivation confers a lubrication which is substantially greater than that of a layer without conversion and allows reaching the critical threshold of 0.2 of coefficient of friction at about 200 steps.

The coating with oxalation confers a superior lubrication to the two previous types of coatings with a critical threshold of 0.2 of coefficient of friction reached between 400 and 600 steps depending on the value of the layer weight. The oxalation therefore allows conferring on the solid deposition layer comprising Zn—Ni to have a much more stable and durable coefficient of friction.

Indeed, the applicant has determined that the oxalate layer specifically improves the plastic deformation of ZnNi on the surface thereof even under a high contact pressure improving the atomic dislocation, the grain rotation and the stability of the system before the flacking of large blocks and the appearance of large-scale defects.

It has been observed that even with a lower layer weight, the oxalate layers produce a longer lasting lubricating film, chemically or physically improving the lubrication efficiency.

According to a variant of the invention, the layer weight of the second layer (12) is comprised between 0.1 g/m² and 20 g/m².

According to another variant of the invention, the layer weight of the second layer (12) is comprised between 0.5 g/m² and 10 g/m².

Advantageously, it has been determined that the endurance is proportional to layer weight, the greater the layer weight the greater the endurance.

However, when the layer weight exceeds a certain threshold, the result is problems of cohesive failure in the oxalation layer. The layer ends up breaking on its own when subjected to external stresses. Consequently, there will be risks of delamination and flaking for the oxalation layer which will lead therewith to the delamination of the third lubricating layer. The applicant has determined that when up to 10 g/m², there is a better compromise between a good endurance and a reduced risk of cohesive failure.

Figure 6:
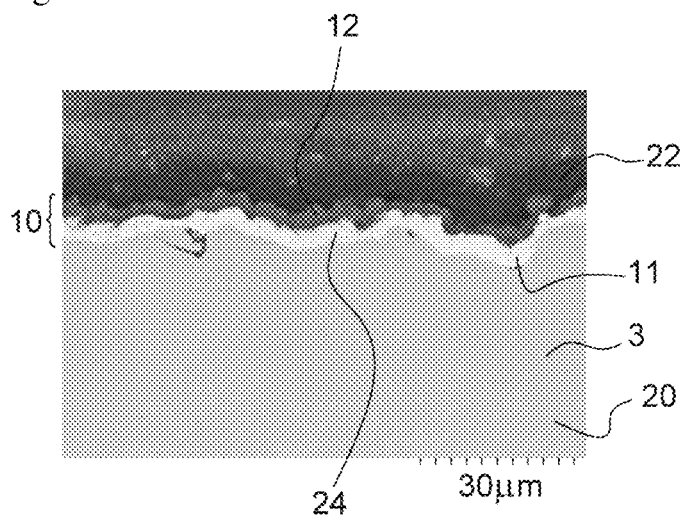
FIG. 6 shows an image taken by SEM (Scanning Electron Microscope) observation, according to a longitudinal sectional view, of a multilayer coating according to the invention.

FIG. 6 describes an image taken by SEM (Scanning Electron Microscope) observation, according to a longitudinal sectional view, of a multilayer coating (10) according to the invention, on the metal substrate (20) of a male threaded end (3).

The multilayer coating (10) comprises a first layer (11) of a solid coating comprising electrodeposited Zinc-Nickel. Said coating also comprises an oxalation-type conversion layer 12. The third lubricating layer comprising a polyurethane or epoxy matrix loaded with solid lubricant particles is not observable as it is, and a plastic coating resin (22) is used for the preparation of the sample for metallographic observation. This resin (22) is only useful to obtain the image of FIG. 6 and therefore does not form part of the invention.

Figure 7:
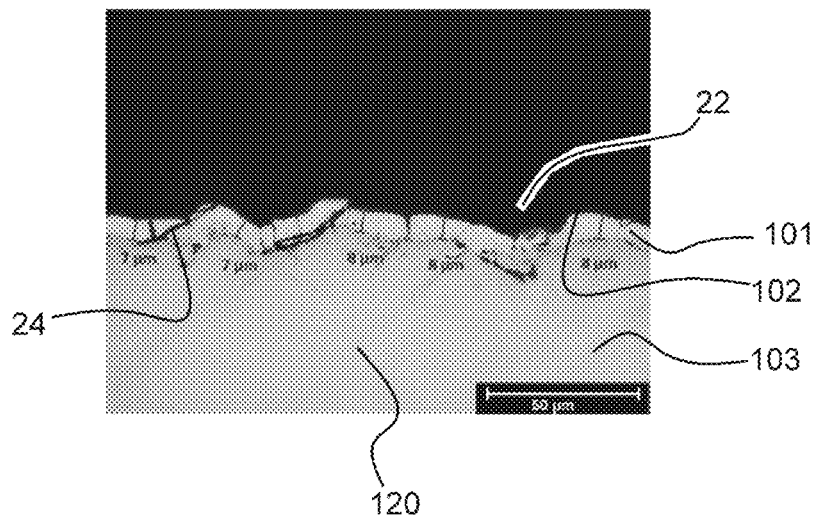
FIG. 7 shows an image taken by SEM (Scanning Electron Microscope) observation, according to a longitudinal sectional view, of a multilayer coating according to the state of the art.

FIG. 7 describes an image taken by SEM (Scanning Electron Microscope) observation, according to a longitudinal sectional view; of a multilayer coating (100) comprising a passivation layer (102), according to the state of the art, on the metal substrate (120) of a male threaded end (103).

The multilayer coating (100) comprises a first layer (101) of a solid coating comprising electrodeposited Zinc-Nickel. The coating also comprises a passivation type conversion layer (102). The third lubricating layer comprising a polyurethane or epoxy matrix loaded with solid lubricant particles is not observable as it is, and a plastic coating resin (22) is used for the preparation of the sample for metallographic observation. This resin (22) is only useful to obtain the image of FIG. 7.

The observation in FIG. 6 shows a thick and textured oxalation layer which measures about 5 µm. However, according to other observations, the oxalation layer can be comprised between 0.5 µm and 30 µm, preferably the layer can be comprised between 1 µm and 20 µm.

Compared with the image in FIG. 7, the second passivation-type conversion layer is simply not observable because it is less than 100 nm.

This difference in observation is important to the extent that it guarantees a minimum thickness for the oxalation and which remains visible. By comparison, this visibility is not found with the passivation of FIG. 7. This thickness has advantages, such as allowing a better resistance of the material. Indeed, on the one hand, a thickness that exceeds a certain threshold, in particular 30 µm, can cause cohesive failure problems. On the other hand, a layer which is less than 0.5 µm or 500 nm is insufficient and will necessarily cause problems of insufficient lubrication.

A cohesive failure is an undesirable effect which can degrade or even eliminate the effect of the second layer, the first zinc-nickel layer becoming vulnerable to the environment and the induced stresses.

With regard to the cracks (24) and other fissures observed in the Zinc-Nickel layer in FIGS. 6 and 7, they resulted from the preparation of the samples for the purposes of the metallographic observation.

Advantageously, the applicant has also determined that the thickness of the second oxalation layer has an insulating barrier type effect for the first solid Zinc-Nickel layer.

FIG. 6 also shows a porosity of the second oxalation layer (12), said porosity of the second layer (12) can be comprised between 5% and 35%.

According to a variant of the invention, the second layer (12) can be comprised between 10% and 25%.

The term "porosity of the second layer" means empty spaces between the base of the crystals, the latter being able to cover said porosity at their height. It is also referred to as open porosity when there are cracks which have a direct path between the Zinc-Nickel layer and the third layer comprising a polyurethane or epoxy matrix loaded with solid lubricant particles.

Advantageously, the porosity allows improving the retention of the upper layer of the multilayer coating thanks to a phenomenon of mechanical anchoring of the upper layer in the empty spaces of the oxalation layer.

By comparison with FIG. 7, this porosity will not be found for a second passivation-type conversion layer according to the state of the art. Indeed, the applicant has determined that a passivation layer is much too thin to admit any porosity.

Figure 8:
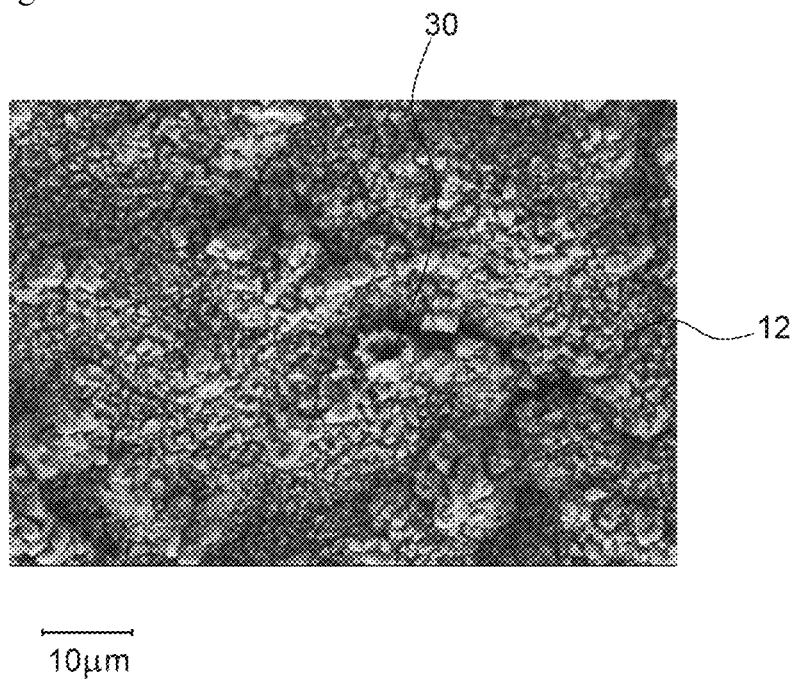
FIG. 8 shows an image taken by SEM (Scanning Electron Microscope) observation according to a top view of the surface of an oxalation-type conversion layer according to the invention at ×5000 magnification.

FIG. 8 describes an image taken by SEM (Scanning Electron Microscope) observation according to an elevated view of the surface of an oxalation-type conversion layer (12) at ×5000 magnification.

It is observed in particular that the surface of the layer is textured by microcracked polyhedrons (30).

The term "microcracked polyhedron" means a 3-dimensional geometric shape having planar polygonal faces which are grouped into segments called edges. The number of faces and edges is random, the length of the edges can range from 0.5 µm to 30 µm. The layer may have randomly distributed microcracks. The width of the cracks can range from 0.05 µm to 1 µm wide. Thanks to this feature, a texture of the microcracked polyhedron type gives the upper layer a capacity of retention and attachment to the oxalation layer.

According to a variant of the invention, the second layer (12) can be produced with an accelerator which has the effect of accentuating the homogenisation of the oxalation, and thus of obtaining a thinner and denser layer.

Figure 9:
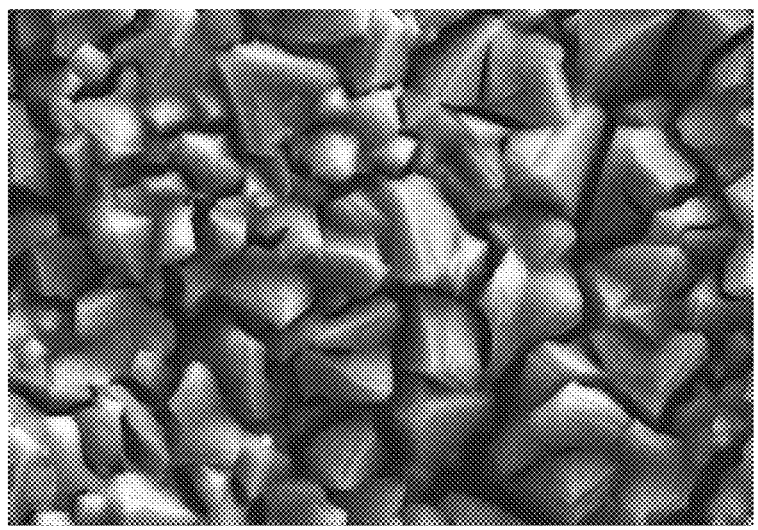
FIG. 9 describes an image taken by SEM (Scanning Electron Microscope) observation according to an elevated view of the surface of an oxalation-type conversion layer according to the invention at ×20000 magnification.

FIG. 9 describes an image taken by SEM (Scanning Electron Microscope) observation according to an elevated view of the surface of an oxalation-type conversion layer according to the invention at ×20000 magnification.

The developments of FIG. 8 are valid and applicable to FIG. 9.

The invention claimed is:

1. A tubular threaded element, comprising:
   a metal body and at least one threaded end comprising at least one threaded portion, said threaded end comprising a multilayer coating on at least one portion of the surface of the threaded end wherein
   said multilayer coating comprises:
   a first layer comprising a solid coating comprising Zinc-Nickel electrodeposited on said at least one portion of the surface of the threaded end;
   an oxalation conversion layer formed on the first layer; and
   a layer of a polyurethane or epoxy matrix comprising solid lubricant particles formed on the second oxalation conversion layer, wherein
   a porosity of the oxalation conversion layer is from 5% to 35%.

2. The tubular threaded element according to claim 1, wherein the oxalation conversion layer comprises nickel oxalate and/or zinc oxalate.

3. The tubular threaded element according to claim 1, wherein the oxalation conversion layer has a layer weight per unit area from 0.1 g/m$^2$ to 20 g/m$^2$.

4. The tubular threaded element according to claim 3, wherein the layer weight per unit area of the oxalation conversion layer is from 0.5 g/m$^2$ to 10 g/m$^2$.

5. The tubular threaded element according to claim 1, wherein the porosity of the oxalation conversion layer is from 10% to 25%.

6. The tubular threaded element according to claim 1, wherein the oxalation conversion layer has a thickness from 0.5 µm to 30 µm.

7. The tubular threaded element according to claim 6, wherein the thickness of the oxalation conversion layer is from 1 µm to 20 µm.

8. The tubular threaded element according to claim 1, wherein the oxalation conversion layer comprises a microcracked polyhedron type texture with edges of from 1 µm to 30 µm in width.

9. The tubular threaded element according to claim 1, wherein the at least one threaded end further comprises a stop surface and a sealing surface, wherein the multilayer coating covers the stop surface and/or the sealing surface.

10. A method for manufacturing the tubular threaded element according to claim 1, comprising:
    electrodepositing a zinc-nickel layer on a metal surface of a threaded end;
    an oxalation conversion treatment of the surface of the zinc-nickel layer to obtain the oxalation conversion layer; and
    covering the oxalation conversion layer with a layer comprising a polyurethane or epoxy matrix loaded with solid lubricant particles.

11. The method for manufacturing a tubular threaded element according to claim 10, wherein the oxalation conversion treatment is carried out at a temperature from 25° C. to 90° C.

12. The method for manufacturing a tubular threaded element according to claim 10, wherein the oxalation conversion treatment comprises treatment with oxalic acid solution having a concentration of from 1 g/L to 75 g/L.

13. The method for manufacturing a tubular threaded element according to claim 12, wherein the oxalic acid solution further comprises an additive selected from the group consisting of a nitrate, a chloride, a thiocyanate, a thiosulphate and a combination thereof.

* * * * *